United States Patent [19]

McMinn

[11] Patent Number: 4,575,926

[45] Date of Patent: Mar. 18, 1986

[54] ELECTRIC GENERATOR WITH RAPID REPLACEABLE MOTOR AND METHOD OF MANUFACTURING SAME

[75] Inventor: Robert R. McMinn, Crosby, Tex.

[73] Assignee: Harrison Equipment Co., Inc., Houston, Tex.

[21] Appl. No.: 571,937

[22] Filed: Jan. 19, 1984

Related U.S. Application Data

[62] Division of Ser. No. 471,700, Mar. 3, 1983, Pat. No. 4,501,982.

[51] Int. Cl.$^4$ ............... H02K 15/02; H02K 15/10
[52] U.S. Cl. .................................................. 29/598
[58] Field of Search ................... 29/596, 598; 310/90

[56] References Cited

U.S. PATENT DOCUMENTS

| | | |
|---|---|---|
| 1,908,295 | 5/1933 | Leister . |
| 3,506,317 | 9/1968 | Angeli . |
| 3,888,597 | 6/1975 | Datta . |
| 3,916,231 | 10/1975 | Cathey ........................... 310/90 X |
| 4,048,530 | 9/1977 | Kaufman, Jr. ................... 310/90 X |
| 4,138,168 | 2/1979 | Herlitzek . |

FOREIGN PATENT DOCUMENTS 1170165 11/1969 United Kingdom .

OTHER PUBLICATIONS

Harrison Equipment brochure, "HYDRA-GEN ® Hydraulic Driven Generators".
Harrison Equipment brochure, "HYDRA-GEN ® Hydraulically Driven A.C. Generators".

Primary Examiner—Mark Rosenbaum
Assistant Examiner—Timothy V. Eley
Attorney, Agent, or Firm—Pravel, Gambrell, Hewitt & Kimball

[57] ABSTRACT

An electrical generator has a rapidly replaceable bearing assembly and motor mounting and method of manufacturing the same. The generator is of the type having a housing holding an armature secured to a generator shaft rotating within the interior of the housing. The housing has a passage through the housing end bell. A bearing assembly rotatably supporting the generator shaft is mounted in the passage. An annular shoulder is formed in the interior wall of the generator housing concentric to the passage. The annular shoulder comprises a first side essentially parallel to the longitudinal axis of the generator shaft and a second side extending between the first side and the passage. An outer groove is formed in the first side of the annular should for mounting a removable outer retaining ring and an inner groove is similarly formed in an outside wall of the bearing assembly that is adjacent to the wall of the passage for mounting a removable inner retaining ring to secure the bearing assembly against the undesired movement outwardly of the housing. The inner and outer rings coact to lock the bearing assembly in the passage. A through-stud extending through an axial bore formed in the generator shaft is attached to a tap slug adaptor having an axial bore with splines for receiving the motor shaft. The tap slug adapter demountably secures the motor shaft in an essentially aligned relationship with the generator shaft.

2 Claims, 2 Drawing Figures

ELECTRIC GENERATOR WITH RAPID REPLACEABLE MOTOR AND METHOD OF MANUFACTURING SAME

This is a division, of application Ser. No. 471,700 filed Mar. 3, 1983 now U.S. Pat. No. 4,501,982.

FIELD OF THE INVENTION

The present invention relates generally to electrical generators and, more particularly, to a generator in which the motor can rapidly be replaced and connected to the generator and a method of manufacturing the same.

DESCRIPTION OF THE PRIOR ART

In known generator set assemblies, the shaft of the motor which rotates an armature shaft to generate electricity was required to be aligned precisely with the longitudinal axis of the generator shaft when the motor was coupled to the generator. This was necessary to reduce undue wear of the supporting bearing assemblies in both the motor and the generator. When either of the two bearing assemblies that mounted the generator shaft needed replacement, the generator through-bolt joining the generator and motor shafts was first unthreaded from interconnection with the motor shaft. This through-bolt was in the form of a rod extending through a central bore in the generator shaft and was threadedly interconnected with the end of the motor shaft to restrain the coupled motor and generator shafts from undesired longitudinal movement. Such disassembly and subsequent reassembly required considerable time and the two generator bearing assemblies necessitated precise alignment of the generator shaft and motor shaft. Additionally, the motor and generator housing surfaces were required to be precisely machined, otherwise the joining of the two units' surfaces would prevent proper alignment of the shafts. An example of such a generator set was the HYDRA-GEN® model, a hydraulic motor driven generator by Harrison Equipment Company, Inc. of Houston, Texas, the owner of the instant invention, and an example of the generator is the model YD of Onan Corp. of Minneapolis, Minn.

SUMMARY OF THE INVENTION

Shortcomings of the prior art device which required two generator bearing assemblies and precision shaft alignment are overcome by the present invention where a pilot portion of the motor shaft is quickly coupled to an accommodating hole of the generator shaft by a tap slug adaptor which is threadedly attached to the generator through-bolt. A single generator shaft bearing assembly and the motor shaft bearing assemblies support the joined motor and generator shafts, reducing the precision of the shaft alignment previously required. Unlike previous generators in which the bearing assembly was press fitted into a passage in the end bell of the generator housing, the present generator shaft bearings are retained in the generator housing passage by the coaction of two removable retaining rings which limit the undesired longitudinal movement of the generator shaft. The retaining rings are easily removed for rapid replacement of the bearing assembly.

More particularly, the generator includes a housing holding an armature secured to a generator shaft which rotates within the interior of the housing. The generator housing has a passage forming a cylindrical wall through the housing end bell, which is the side opposite a machined side adjacent to a motor means for rotating the generator shaft. A bearing assembly rotatably supporting the generator shaft is mounted in the passage. An annular shoulder is formed in the interior wall of the generator housing and is concentric to the passage. The annular shoulder comprises a first side which is essentially parallel to the longitudinal axis of the generator shaft and a second side perpendicular to the first side, the latter extending between the first side and the wall of the passage. An outer groove is formed in the first side of the annular shoulder for mounting a removable outer retaining ring. An inner groove is similarly formed in an outside wall of the bearing assembly that is adjacent to the wall of the passage for mounting a removable inner retaining ring to secure the bearing assembly against the undesired movement outwardly of the housing.

The inner and outer rings coact to lock the bearing assembly in the passage. A through-stud extending through an axial bore formed in the generator shaft threadedly engages a tap slug adaptor having an axial bore with splines for receiving the motor shaft. The tap slug adapter demountably secures the motor shaft in an essentially aligned relationship with the generator shaft. The tap slug adaptor, through a coupling which couples the adapter and motor shaft together, transmits the rotation of the motor shaft to the generator shaft.

DESCRIPTION OF THE PREFERRED EMBODIMENT

Figure 1:
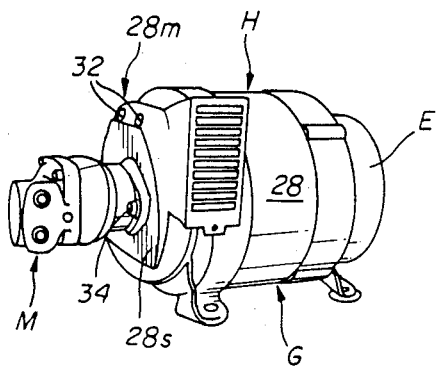
FIG. 1 is a perspective view of a generator of the type to which the present invention is applied; and, FIG. 2 is a cross-sectional view of the bearing arrangement of the present invention.

Referring to the drawings, a generator G is adapted to be used in combination with a motor M for generating electrical power. The generator G has a housing H in which a typical rotating armature A is mounted on a generator shaft 10 for generating electrical power. The housing H has a passage or opening 12 which includes a cylindrical wall or surface 12a formed in a side or end bell E of the housing H opposite the side adjacent to the motor M. The motor M drives a rotating shaft 14 for rotating the generator shaft 10 to generate electricity.

Figure 2:
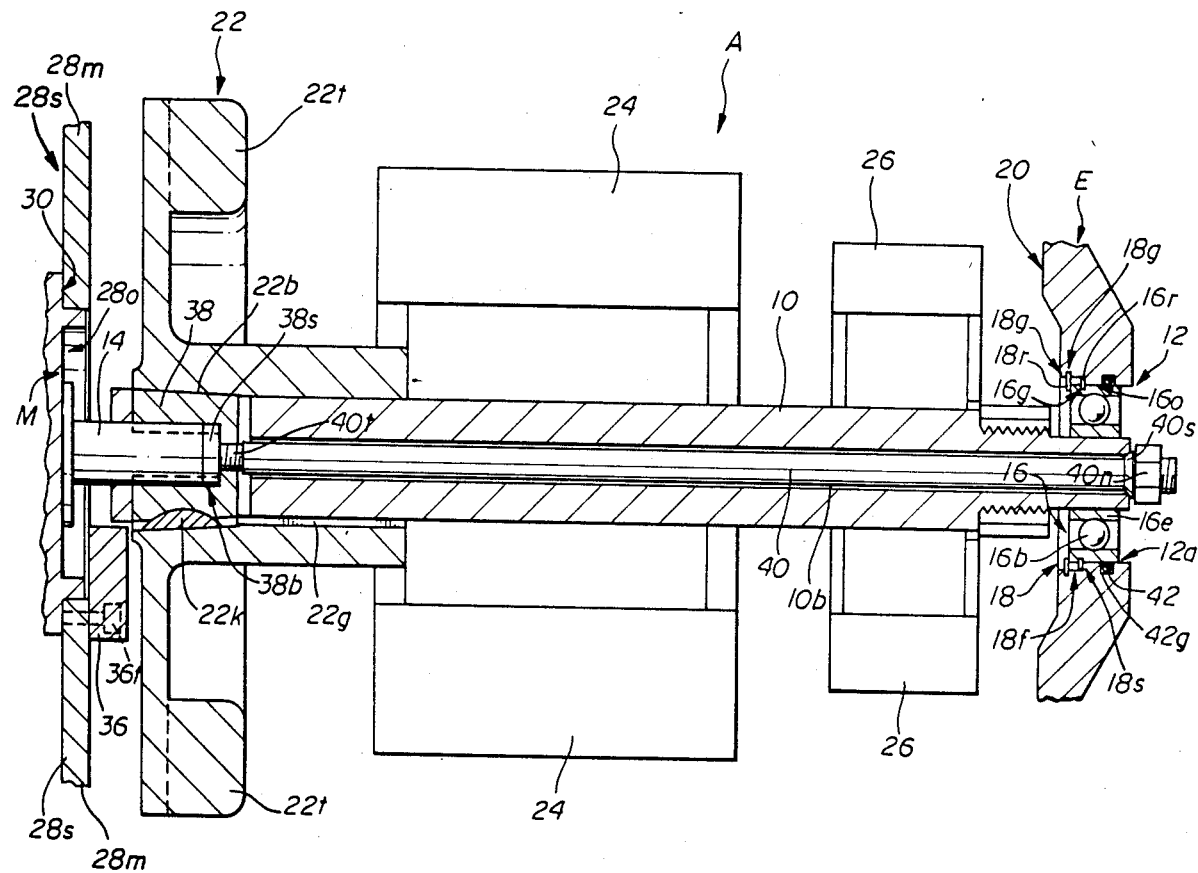

The armature assembly A typically comprises a blower 22 with teeth 22t, rotor windings 24 and exciter windings 26, all of which are mounted on the generator shaft 10 (see FIG. 2). The counterpart units of the rotor and exciter windings necessary for the generation of electricity are not depicted in the figures since these component parts are well known in the art and their construction would be obvious to one having ordinary skill.

The generator housing H typically includes three segments: a middle section 28, the end bell E on the side opposite the motor M, and a motor section 28m on side of housing H adjacent to motor M (see FIG. 1). Generally, the motor section 28m has a machined surface 28s adapted to engage an abutting complementary surface 30 of motor M (see FIG. 2). An outer surface 28s of the middle section 28 is formed with an opening 28o through which the shaft 14 projects to be joined with the shaft 10. Machined surface 30 of motor M formed complementary to surface 28s engages surface 28s upon mounting of the motor M to the generator G.

The end bell E, middle section 28 and motor section 28m are assembled to form the complete housing H and are secured together by means of threaded rods (not shown) and nuts 32 (see FIG. 1).

Suitable bolts (not shown) and cooperating nuts 34 preferably secure the motor M to the housing H with surfaces 30 and 28s abutting each other to limit the longitudinal movement of the motor shaft 14 in relation to the generator G and the shaft 10.

A known ring-shaped bearing assembly 16 which rotatably supports the generator shaft 10 is mounted in the passage 12. The bearing assembly 16 is a typical sealed bearing assembly that is press mounted or frictionally secured onto the end of the generator shaft 10 that is opposite the motor M. The bearing assembly 16 preferably comprises an annular inner race 16i, an annular outer race or wall 16o and a plurality of bearings 16b. Generally, the bearing 16 is sealed and pre-lubricated to reduce friction and wear.

An annular shoulder 18 is cut or otherwise formed in the interior wall 20 of the end bell E of housing H. The diameter of the shoulder 18 is slightly larger than the diameter of the passage 12. The annular shoulder 18 is concentric to the passage 12 and comprises a first side 18f that is parallel to the longitudinal axis of the generator shaft 10 and a second side 18s perpendicular to the first side 18f. The second side 18s extends between the first side 18f and the wall 12a of the passage 12.

An annular outer groove 18g is cut or otherwise formed in the first side 18f of the annular shoulder 18 for mounting a removable outer retaining or snap ring 18r to secure the bearing assembly 16 and the shaft 10 against undesired longitudinal movement relative to the interior of the housing H.

An annular inner groove 16g is also formed in the outside wall or surface of the bearing assembly 16 adjacent to the surface 12a of the passage 12 for mounting a removable inner retaining or snap ring 16r to secure the bearing assembly 16 against undesired movement outward of the housing H. The inner retaining ring 16r engages a second side 18s of the annular shoulder 18 when the bearing 16 is mounted in the end bell E, while the outer retaining ring 18r engages the bearing assembly 16. The rings 16r and 18r coact to lock the bearing 16 in the passage 12, restraining undesired longitudinal movement of the bearing 16 and the generator shaft 10 which is rotatably mounted within bearing assembly 16.

A tap slug adaptor 38 is connected to an end of a through-stud 40 preferably by means of threads 40t. The tap slug adaptor 38 resembles a bucket and generally comprises a cylindrical or generally tapered body having an axial bore or hollow 38b through a portion of the longitudinal axis of the adaptor 38. The bore 38b is adapted to engage a pilot portion of the motor shaft 14 to transmit the rotation of motor shaft 14 to the generator shaft 10. Preferably the bore 38b of tap slug adaptor 38 includes splines 38s which mate with complementary splines formed on motor shaft 14 (not shown) for coupling the shafts 10 and 14. The splines operate to distribute the torque on the adapter 38 created by rotation of the motor shaft 14 when the shafts 10 and 14 are joined. An alternative to the coupling splines 38s would be complementary grooves formed in both the bore 38b and the motor shaft 14 for receiving a key or bar to secure the adaptor 38 and motor shaft 14 against slippage during rotation.

The through-stud 40 is formed as a cylindrical rod with threaded ends designed to extend through a central axial bore 10b formed in the generator shaft 10. The portion of stud 40 extending outside of the end bell E is threaded to accept a retaining nut 40n of sufficient diameter to engage the generator shaft 10. The inner surface 40s of the nut 40n is tapered and engages a complementary shaped surface on the shaft 10. Alternatively, surface 40s is a conical washer between nut 40n and shaft 10. The nut 40n limits the longitudinal movement of the through-stud 40 and the tap slug adaptor 38 relative to shaft 10.

The blower 22 is formed with a key 22k mounted in groove 22g of a conically-shaped central bore 22b to engage the adaptor 38 for coupling the blower 22 and the adapter 38 to transmit the rotational energy imparted by the motor shaft 14 to the armature assembly A. As the nut 40n is tightened or screwed onto the stud 40, the adapter 38 is pulled into the bore 22b of the blower 22 which operates to hold the shaft 10 in a fixed position between the adapter 38 and the nut 40n, preferably adapter 38 abuts the end of shaft 10. Thus, rotation of the adapter 38 by motor M is directly transmitted to the armature A and the shaft 10.

Preferably, the motor section 28m includes a block-like support cradle 36 which is secured to the interior of the motor section 28 by a screw 36t. The support cradle 36 prevents inadvertent damage to the blower 22 when the motor M is removed by catching the adapter 38 connected to shaft 10 and stud 40 of armature A and stopping further downward movement as the pilot portion of motor shaft 14 is removed from the inner bore 38b of the tap slug adaptor 38.

An 0-ring 42 formed of resilient material is mounted within a groove 42g formed in the surface 12a and operates to center the bearing assembly 16 within passage 12.

Method of Manufacture

Generators having rapid replaceable motors constructed in accordance with the present invention may be manufactured in a greatly simplified manner. An annular shoulder 18 is first cut or otherwise formed in the interior wall 20 of the end bell E of housing H. The shoulder 18 is formed concentric to the passage 12 and has a slightly larger diameter. The annular shoulder 18 comprises a first side 18f essentially parallel to the longitudinal axis of the generator shaft 10 and a second side 18s essentially perpendicular to the first side 18f. A second side 18s extends between the first side 18f and the wall 12a of the passage 12. An annular, outer groove 18g is then formed in the first side 18f of the annular shoulder 18 for mounting a removable retaining ring 18r to secure the bearing assembly 16 against movement toward the interior of the housing H. An annular inner groove 16g is formed in an outside wall 16o of the bearing assembly which is adjacent to the wall 12a of the passage 12.

A removable retaining or snap ring 16r is mounted within the inner groove 16g to secure the mounted bearing assembly 16 against movement outward of the housing H. The bearing assembly 16, having been frictionally mounted upon the generator shaft 10 which includes an armature A, is then mounted in the passage 12 such that the inner ring 16r engages the second wall 18s of the annular shoulder 18. The outer retaining ring 18r is then mounted in the outer groove 18 for engaging the bearing assembly 16 to lock it and the generator shaft 10 in place. A through-stud 40 with attached nut 40n is threadedly connected by means of threads 40t to a tap slug adaptor 38 which is adapted to engage a portion of the the motor shaft 14 for transmitting the rotation of the motor shaft 14 to the generator shaft 10.

Operation

Operation of the present invention is as follows. The generator is assembled as described above by first locking the bearing assembly 16 into place with the inner and outer rings 16r, 18r. The motor M is positioned such that the surface 30 adjoins the surface 28s of housing H and a portion of the motor shaft 14 extends through the opening 28o. The end portion of motor shaft 14 which extends into the interior of housing H is coupled to the tap slug adaptor 38 by positioning the end portion of the shaft 14 into the bore or hollow 38b with the splines 38s mating with the complementary splines on the motor shaft 14. The motor M is then secured to the generator G by the usual means of bolts (not shown) and cooperating nuts 34.

As the motor shaft 14 rotates, the splines 38s couple the rotation of the shaft 14 to generator shaft 10 and distribute the torque evenly among the splines.

To remove the motor M and bearing assembly 16, nuts (not shown) and cooperating bolts 34 are disconnected and the motor M is removed from engagement with the generator G. The motor cradle 36 catches the motor shaft 14 and prevents any damage to the blower teeth 22t if the motor shaft 14 should be inadvertently dropped. The present invention eliminates the need for the through-stud 40 to be unthreaded from the motor shaft 14.

In order to replace the bearing assembly, the generator housing H is separated, permitting exposure of and access to the outer retaining ring 18r. The outer ring 18r is then removed. The bearing assembly 16 can then be removed by pressing the bearing assembly 16 out of the passage 12 toward the interior of the housing H.

With the present invention, after the bearing assembly 16 has been locked into position it can easily be removed from its mounting within the passage 12. In prior art devices, the bearing assembly 16 was frictionally mounted by pressing the assembly 16 into the passage 12. The bearing assembly 16 was thus not locked into place and longitudinal movement of the shaft was restricted by the threading of the through-stud directly into the motor shaft; whereas, the present invention limits undesired movement by the coaction of the rings 16r and 18r.

Threadedly connecting the through-stud directly to the end of motor shaft 14 and including a second bearing assembly to support shaft 10, as was previously done, required more precise alignment of the shaft 14 with the generator shaft 10 and the through-stud 40 so that threads 40t could be screwed into the end of shaft 14. With the present invention, the motor shaft 14 merely is positioned within the tap slug adaptor 38, eliminating a second generator bearing assembly and the time previously required to replace the prior second bearing assembly.

The foregoing disclosure and description of the invention are illustrative and explanatory thereof, and various changes in the size, shape and materials, as well as in the details of the illustrated construction may be made without departing from the spirit of the invention.

I claim:

1. A method for manufacturing an electrical generator with a rapidly replaceable motor of the type which comprises a housing with an end bell portion, a generator shaft rotatable within the housing, an armature connected to a shaft within the interior of the housing, an opening formed in the end bell of the housing opposite a motor with a rotating motor shaft for rotating the generator shaft, a bearing assembly frictionally mounted within the opening rotatably supporting one end of the generator shaft opposite the motor, the invention comprising the steps of:

said opening forming with an inner, annular surface and forming an annular shoulder in said inner annular surface of said opening, said shoulder comprising a first side parallel to the longitudinal axis of the generator shaft and a second side perpendicular to said first side, said second side extending between said first side and said inner annular surface of said opening;

forming an annular outer groove in said first side of said annular shoulder for mounting a removable outer retaining ring to restrict the bearing assembly against undesired longitudinal movement inward of the housing;

forming an annular inner groove in the outer surface of the bearing assembly adjacent the opening for mounting a removable inner retaining ring to restrict the bearing assembly against undesired longitudinal movement outward of the housing and locking the bearing assembly in the opening;

mounting a removable inner retaining ring onto the bearing assembly;

inserting the bearing assembly into the opening to engage said inner retaining ring with said inner annular surface of said opening such that said inner retaining ring engages said second wall of said annular shoulder; and mounting an outer retainer ring in said first groove in said first side of said annular shoulder whereby said bearing assembly is restricted against movement longitudinal in a direction inwardly or outwardly of said housing.

2. The method set forth in claim 1, including:

connecting a tap slug adaptor to one end of a through-stud extending through a central axis bore of the generator shaft; said adaptor having an axial bore for receiving a portion of the motor shaft to demountably secure the motor shaft in an essentially aligned relationship with the generator shaft; and providing said bore of said tap slug adaptor with means for coupling said adapter and the motor shaft to transmit the rotation of the motor shaft to the generator shaft.

* * * * *